(12) United States Patent
Artman et al.

(10) Patent No.: US 10,102,041 B2
(45) Date of Patent: Oct. 16, 2018

(54) CONTROLLING WORKLOAD PLACEMENT TO MANAGE WEAR OF A COMPONENT NEARING END OF LIFE

(71) Applicant: Lenovo Enterprise Solutions (Singapore) Pte. Ltd., Singapore (SG)

(72) Inventors: Paul Artman, Cary, NC (US); Gary D. Cudak, Wake Forest, NC (US); Fred A. Bower, III, Durham, NC (US); Ajay Dholakia, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 251 days.

(21) Appl. No.: 15/085,127

(22) Filed: Mar. 30, 2016

(65) Prior Publication Data
US 2017/0286176 A1    Oct. 5, 2017

(51) Int. Cl.
G06F 9/46    (2006.01)
G06F 9/50    (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS 9,450,876 B1 *    9/2016    Marr ..................... H04L 47/125
2010/0281294 A1 *    11/2010    Soulet .................. H04L 41/042
714/2

* cited by examiner

*Primary Examiner* — Diem Cao
*Assistant Examiner* — Steven Do
(74) *Attorney, Agent, or Firm* — Jeffrey L. Streets

(57) ABSTRACT

A method includes tracking, for each of a plurality of workloads, a wear rate incurred by a component of a given component type as a result of processing an instance of the workload on a compute node that includes the component. The method further comprises determining a remaining lifespan for a plurality of components in a plurality of compute nodes, and identifying a component from among the plurality of components having a remaining lifespan of less than a first threshold amount. Sill further, the method comprises identifying an instance of one of the workloads that needs processing and has a wear rate greater than a second threshold amount, and processing the identified workload instance on the identified component.

18 Claims, 4 Drawing Sheets

38

Workload Wear Data

| Workload ID | Wear Rate (% lifespan/hour) | | |
|---|---|---|---|
| | Processor | Memory Module | Data Storage Device |
| A | 0.001 | 0.001 | 0.001 |
| B | 0.1 | 0.05 | 0.005 |
| C | 0.3 | 0.07 | – |
| D | 0.01 | 0.12 | – |

Component Lifespan Data

Compute Node C

Compute Node B

Compute Node A

| Compont Type | Component | Est. Comp. Lifespan | Tot.Comp. Runtime | Remaining Lifespan (%) |
|---|---|---|---|---|
| Processor | P-1 | | | 5 |
| Memory Module | M-1 | | | 10 |
| | M-2 | | | 15 |
| | M-3 | | | 30 |
| | M-4 | | | 5 |
| Data Storage | HD | | | 40 |
| | FD | | | 5 |

FIG. 4

CONTROLLING WORKLOAD PLACEMENT TO MANAGE WEAR OF A COMPONENT NEARING END OF LIFE

BACKGROUND

Field of the Invention

The present invention relates to workload management and placement in a computing system.

Background of the Related Art

A datacenter may contain and facilitate the use of a large number of computer servers or compute nodes. Each compute node includes a large number of individual components that support the compute node in performing a workload. The overall capacity of a compute node is a function of the capacity and number of the individual components.

When one of the individual components fails or experiences a high error rate, the overall capacity of the compute node declines. At some point it may be necessary to replace the damaged component in order to regain the full capacity or functionality of the compute node. Such replacement causes the compute node to be taken out of service for a period of time and imposes a cost of the replacement component and a cost of labor to replace the component. Alternatively, the entire compute node may be replaced as a result of the wear experienced by one or more of the components.

One approach to reducing component failures is to design more robust components having an enhanced reliability and an extended life. However, such components are generally more expensive and the compute node within which the component is installed will generally become obsolete after a period of years. Another approach is to provide redundant components so that a failure does not lead to loss of data or system downtime. However, the extra components needed to provide redundancy similarly increase the cost of the system and a failed component must still be replaced in order to maintain the same level of redundancy. Unscheduled downtime of a compute node reduces the capacity of a computing system and may result in extended downtime and greater expense than if the component or compute node were replaced during a scheduled maintenance period.

BRIEF SUMMARY

One embodiment of the present invention provides a method comprising tracking, for each of a plurality of workloads, a wear rate incurred by a component of a given component type as a result of processing an instance of the workload on a compute node that includes the component. The method further comprises determining a remaining lifespan for a plurality of components in a plurality of compute nodes, and identifying a component from among the plurality of components having a remaining lifespan of less than a first threshold amount. Sill further, the method comprises identifying an instance of one of the workloads that needs processing and has a wear rate greater than a second threshold amount, and processing the identified workload instance on the identified component.

Another embodiment of the present invention provides a computer program product comprising a non-transitory computer readable storage medium having program instructions embodied therewith, wherein the program instructions are executable by a processor to cause the processor to perform a method. The method comprises tracking, for each of a plurality of workloads, a wear rate incurred by a component of a given component type as a result of processing an instance of the workload on a compute node that includes the component. The method further comprises determining a remaining lifespan for a plurality of components in a plurality of compute nodes, and identifying a component from among the plurality of components having a remaining lifespan of less than a first threshold amount. Sill further, the method comprises identifying an instance of one of the workloads that needs processing and has a wear rate greater than a second threshold amount, and processing the identified workload instance on the compute node that includes the identified component.)

BRIEF DESCRIPTION OF THE SEVERAL VIEWS OF THE DRAWINGS

FIG. 3 is a table illustrating workload wear data according to one embodiment of the present invention.

FIG. 4 is a table illustrating component lifespan data according to one embodiment of the present invention.

DETAILED DESCRIPTION

Figure 1:
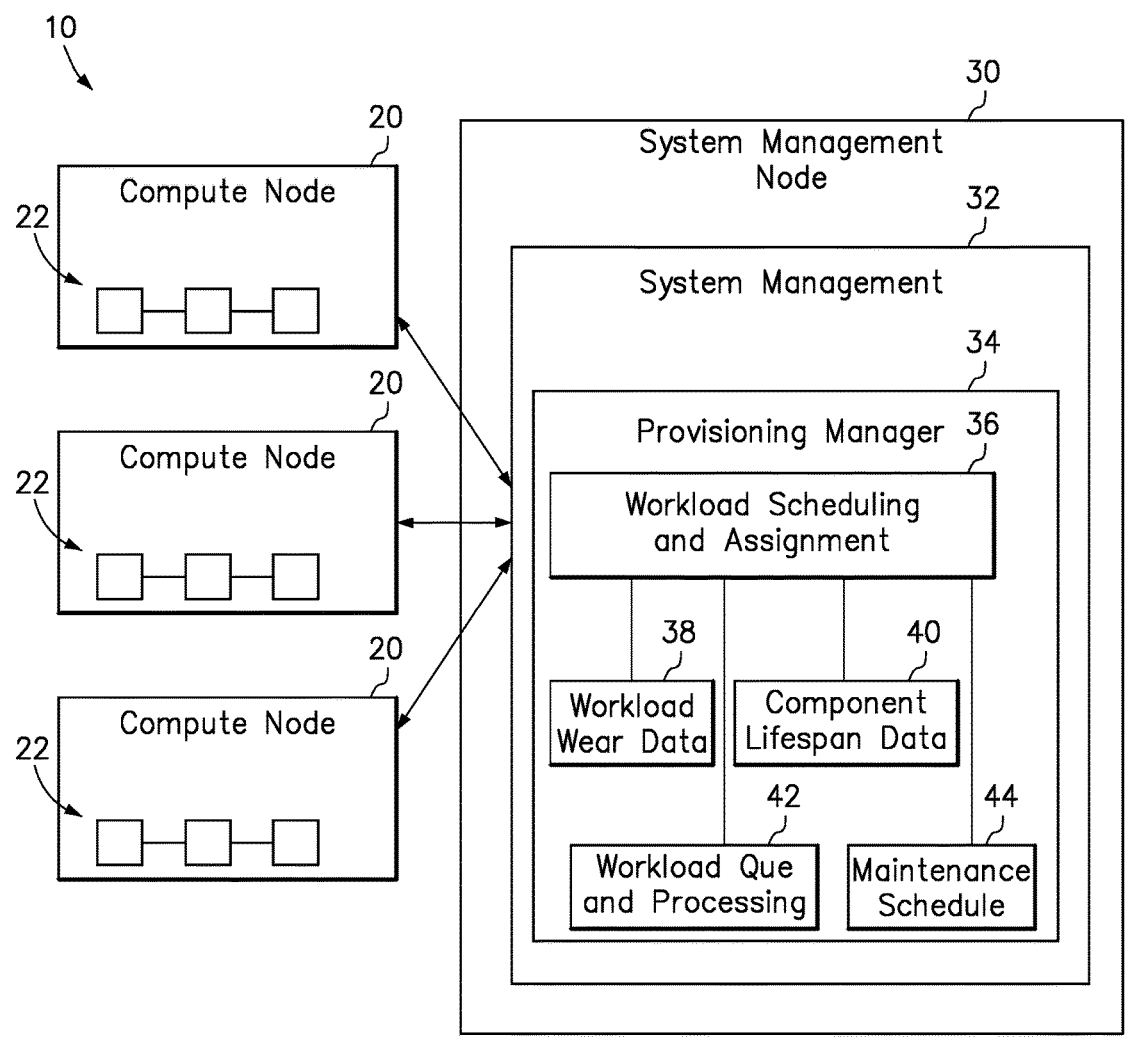
FIG. 1 is a diagram of a computer system including a plurality of compute nodes and a system management node.

One embodiment of the present invention provides a method comprising tracking, for each of a plurality of workloads, a wear rate incurred by a component of a given component type as a result of processing an instance of the workload on a compute node that includes the component. The method further comprises determining a remaining lifespan for a plurality of components in a plurality of compute nodes, and identifying a component from among the plurality of components having a remaining lifespan of less than a first threshold amount. Sill further, the method comprises identifying an instance of one of the workloads that needs processing and has a wear rate greater than a second threshold amount, and processing the identified workload instance on the compute node that includes the identified component.

The term "workload" is used herein consistent with the terms "job", "task", or "process." Accordingly, an instance of a workload is a single occurrence of performing the workload. It should be apparent that a workload may be performed any number of times and multiple instances of a workload may be performed in succession or simultaneously on one or more compute nodes. A particular workload may be characterized by a "wear rate", which indicates a rate at which processing of the workload will wear out a component on the compute node that processes the workload. The wear rate may be expresses in various units of measures, such as percentage of component lifespan per hour processing the workload.

A wear rate incurred by a component of a given component type as a result of processing an instance of the workload may be tracked in various ways. For example, a management may, over time, collect failure rate data on components within a network or cluster in which the workload is typically processed. Component failures occurring in the compute nodes processing the workload may be considered in determining a wear rate associated with the workload. Furthermore, a component may have one or more health parameters that can be periodically measured and used to indicate a gradual wearing out of the component with processing of each instance of the workload. Still further, the wear rate may be determined by counting a number of operations of the component attributable to the processing of the workload and comparing the total number of operations to a predetermined number of operations expected during the lifespan of the component. For example, a workload that involves an extremely high number of disk accesses or instructions per unit of time will have a higher wear rate for a hard disk drive or a processor than other workloads. Furthermore, the method may track a wear rate incurred by a plurality of components in a compute node as a result of processing an instance of the workload. For example, the plurality of components in a compute node may be, without limitation, selected from a processor, a memory module, and a data storage device.

The remaining lifespan for any one or more component of a computing system may be determined by subtracting a total run time from an average lifespan for the component, or subtracting a total number of operations from an expected maximum number of operations for the component. The expected maximum number of operations may be obtained by tracking components within the computing system or using published failure rate data, such as mean-time-between-failure (MTBF) values. Alternatively, a remaining lifespan for each component of a computing system may be predicted based on a failure analysis (i.e., predictive failure analysis (PFA)) using one or more measured performance parameters of the component. For example, an error rate for each component may be tracked over a period of time, such that an increasing error rate) indicates that a component is experiencing wear. A certain error rate may indicate that the component is about to fail, or a certain error rate may become so high that the component is completely ineffective and must be replaced.

Having determined the remaining lifespan for the one or more components, the method may identify a component from among the plurality of components having a remaining lifespan of less than a first threshold amount. The first threshold amount is preferably set sufficiently high so only those components that are approaching the end of their lifespan are identified. In one non-limiting example, the first threshold amount may be greater than 80% of the expected lifespan of the one or more components. It should be recognized that the expected lifespan of each component may vary as a function of the component type, component manufacturer, and component model. Furthermore, the most reliable lifespan data for any given component may focus on different variables. For example, flash memory may be limited by a number of write cycles regardless, whereas hard disk drives may experience an increasing failure rate after about three years in service. Accordingly, if a system administrator has a policy of replacing hard disk drives at a certain age, then that age may be considered to the be component lifespan for hard disk drives in that system even if some of the hard disk drives may not actually fail by the time they reach that age.

The step of identifying an instance of one of the workloads that needs processing may include identifying an instance of one of the workloads that is queued for processing. Accordingly, workload requests are received and queued, and an instance of a workload is identified from the queue, such that the method may then assign the identified instance of the workload to a compute node including the identified component. Alternatively, the step of identifying an instance of one of the workloads that needs processing may include identifying an instance of one of the workloads that is currently being processed by one of the compute nodes in the computing system. Accordingly, various workloads are already being processed by one compute node, but the method may then migrating the identified instance of the workload to a compute node including the identified component.

In a further embodiment of the present invention, the method may consider a maintenance schedule for one or more of the compute nodes. Such a maintenance) schedule may optionally be obtained from a management node or may be determined from a history that identifies when compute nodes are taken offline and/or when new compute nodes are added to the system. For example, the method may further comprise determining an amount of time before one or more of the compute nodes is scheduled for maintenance. The step of identifying an instance of one of the workloads that needs processing and has a wear rate greater than a second threshold amount, may include identifying an instance of one of the workloads that has a wear rate that would, if processed on one of the compute nodes scheduled for maintenance, exhaust the remaining lifespan of the identified component during the amount of time before the scheduled maintenance. Accordingly, the identified component may be driven to exhaustion so that the component has provided its maximum benefit, yet may be replaced during the scheduled maintenance. The method may determine, for each workload that needs processing, an amount of time for the component to exhaust the remaining lifespan of the component. This determination may be helpful in identifying which workload should be assigned or migrated to the compute node that includes the component. In a preferred option, the method may further include periodically storing a snapshot of the state of the compute node processing the identified workload. The use of snapshot may prevent loss of the work product of the processing, which may be viewed as being at a heightened risk during the period that the component is being driven to the end of their lifespan.

Still further, embodiments of the method may determine a preferred time to assign or migrate an identified workload to an identified compute node. Using the wear rate of the identified workload and the estimated remaining lifespan of the identified component, it is possible to determine the run time until failure of the component. For example, if the identified workload has a processor wear rate of 1% lifespan/hour and the identified processor is determined to have 5% remaining lifespan, then the lifespan of the processor may exhausted in a period of 5 hours. Accordingly, in order to obtain the greatest benefit from the processor before schedule maintenance, the identified workload should be assigned or migrated to the compute node including the identified component at least 5 hours prior to the schedule maintenance.)

Another embodiment of the present invention provides a computer program product comprising a non-transitory computer readable storage medium having program instructions embodied therewith, wherein the program instructions are executable by a processor to cause the processor to perform a method. The method comprises tracking, for each of a plurality of workloads, a wear rate incurred by a component of a given component type as a result of processing an instance of the workload on a compute node that includes the component. The method further comprises determining a remaining lifespan for a plurality of components in a plurality of compute nodes, and identifying a component from among the plurality of components having a remaining lifespan of less than a first threshold amount. Sill further, the method comprises identifying an instance of one of the workloads that needs processing and has a wear rate greater than a second threshold amount, and processing the identified workload instance on the compute node that includes the identified component.

The foregoing computer program products may further include program instructions for implementing or initiating any one or more aspects of the methods described herein. Accordingly, a separate description of the methods will not be duplicated in the context of a computer program product.

FIG. 1 is a diagram of a computer system 10 including a plurality of compute nodes 20 and a system management node 30. Each compute node 20 includes a plurality of components 22, such as one or more processor, one or more memory modules, and one or more data storage devices. Each compute node will include many other components that are not identified here, and the methods of the present invention may track the lifespan of some of those components as described herein. Each compute node 20 is capable of processing one or more workload assigned to the compute node by the system management node 30. In this example, the system management node 30 runs a system management application 32 that includes a provisioning manager 34. A workload scheduling and assignment module 36 executes logic consistent with one or more method embodiments of the present invention, and has access to workload wear data 38, component lifespan data 40, workload que and processing data 42 and a maintenance schedule 44. Some of the data may not be necessary in every disclosed embodiment.)

Figure 2:
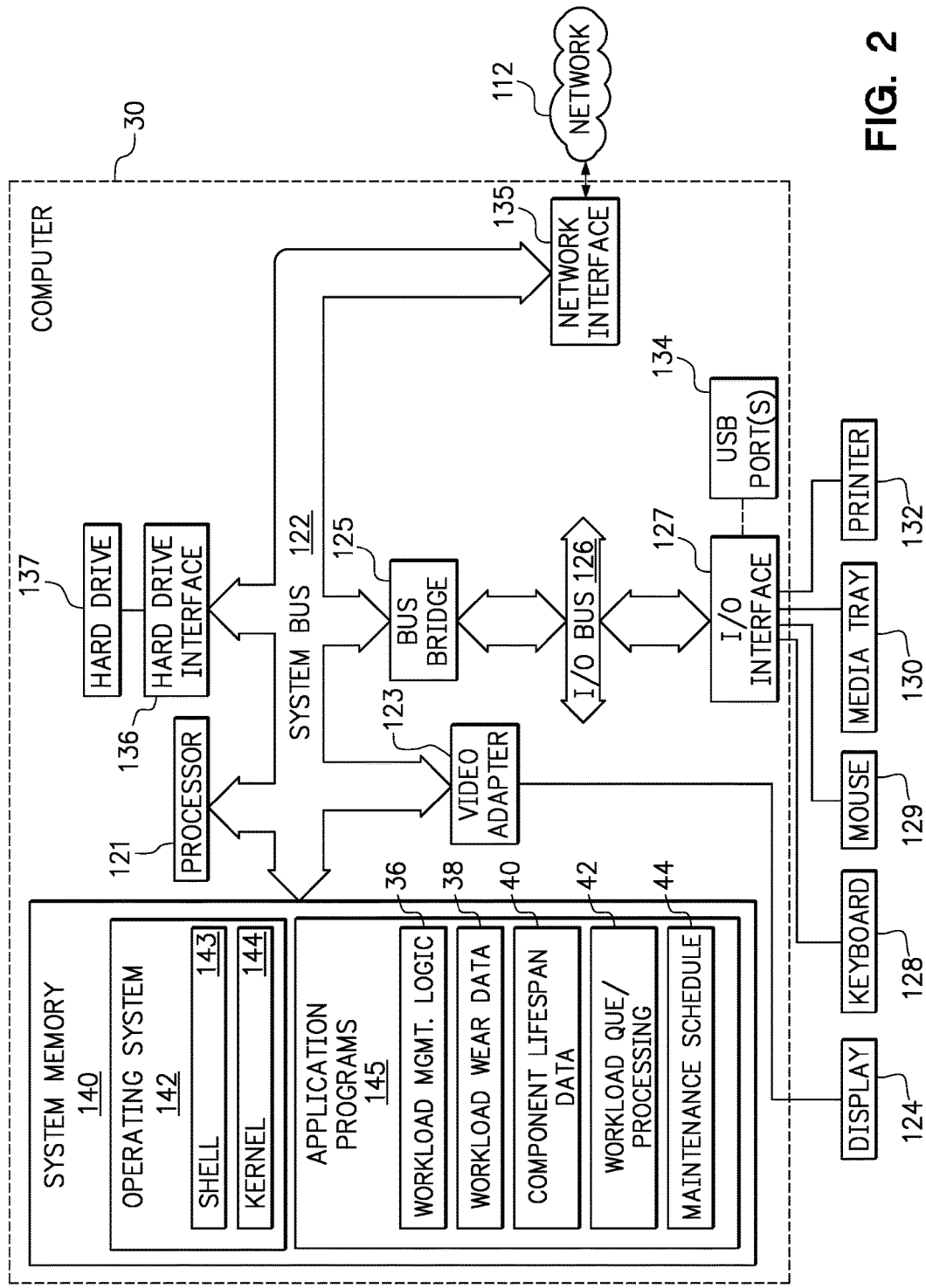
FIG. 2 is a diagram of a computer representative of the components in a compute node and the system management node.

FIG. 2 is a diagram of the system management node 30 that is capable of implementing the methods of the present invention. However, the structure of the node may also be representative of any one of the compute nodes 20. In this non-limiting example, the node 30 includes a processor unit 121 that is coupled to a system bus 122. The processor unit 121 may utilize one or more processors, each of which has one or more processor cores. A video adapter 123, which drives/supports a display 124, is also coupled to the system bus 122. The system bus 122 is coupled via a bus bridge 125 to an input/output (I/O) bus 126. An I/O interface 127 is coupled to the I/O bus 126 and provides communication with various I/O devices, including a keyboard 128, a mouse 129, a media tray 130 (which may include storage devices such as CD-ROM drives, multi-media interfaces, etc.), a printer 132, and USB port(s) 134. As shown, the compute node 30 is able to communicate with other network devices via the network 112 using a network adapter or network interface controller 135.

A hard drive interface 136 is also coupled to the system bus 122. The hard drive interface 136 interfaces with a hard disk drive 137. In a preferred embodiment, the hard disk drive 137 communicates with system memory 140, which is also coupled to the system bus 122, preferably through a memory controller. System memory includes the lowest level of volatile memory in the node 30. This volatile memory may include additional higher levels of volatile memory (not shown), including, but not limited to, cache memory, registers and buffers. Data that populates the system memory 140 includes the operating system (OS) 142 and application programs 145.

The operating system 142 includes a shell 143 for providing transparent user access to resources such as application programs 145. Generally, the shell 143 is a program that provides an interpreter and an interface between the user and the operating system. More specifically, the shell 143 executes commands that are entered into a command line user interface or from a file. Thus, the shell 143, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 144) for processing. Note that while the shell 143 is a text-based, line-oriented user interface, the present invention will equally well support other user interface modes, such as graphical, voice, gestural, etc.

As depicted, the operating system 142 also includes the kernel 144, which includes lower levels of functionality for the operating system 142, including providing essential services required by other parts of the operating system 142 and application programs 145, including memory management, process and task management, disk management, and mouse and keyboard management. The application programs 45 in the system memory of the system management node 30 may include, without limitation, workload management logic 36 which executes logic consistent with one or more method embodiments of the present invention. The memory 140 may further include workload wear data 38, component lifespan data 40, workload que and processing data 42 and a maintenance schedule 44. One example of the workload management logic 36 is the method 50 of FIG. 5.

The hardware elements depicted in the compute node 30 are not intended to be exhaustive, but rather are representative. For instance, the compute node 30 may include alternate memory storage devices such as magnetic cassettes, digital versatile disks (DVDs), Bernoulli cartridges, and the like. These and other variations are intended to be within the scope of the present invention.

FIG. 3 is a table illustrating workload wear data 38 according to one embodiment of the present invention. The workload wear data identifies four workloads (A, B, C and D) that have been tracked to determine a wear rate. For each of the four workloads, a separate wear rate has been determined for a processor, memory module and data storage device. Due the nature of the individual workloads, the wear rate may vary among the components types and among the various workloads. In this illustration, a wear rate threshold of 0.025 (% lifespan/hour) may be used, such that the data associated with a component having a wear rate greater than the wear rate threshold has been highlighted with a striped background. These workloads (A, B and C) are the "identified workloads" that may be processed on a compute node that includes an identified component in order to accelerate wear of the identified component in accordance with embodiments of the present invention. If there is a time window prior to scheduled maintenance, Workload C would wear the processor of the compute node faster than any other workload, and Workload D would wear a memory module faster than any other workload.

FIG. 4 is a table illustrating component lifespan data 40 according to one embodiment of the present invention. In this example, a separate table of component lifespan data is maintained for the components of each compute node. While the component list is not exhaustive, the data will preferably track the lifespan of certain critical components that are known to experience wear. For example, each component record (row of the table) identifies the component type, a component identifier, estimated component lifespan (data not shown), total component runtime (data not shown), and a remaining lifespan. As previously stated, the remaining lifespan may be calculated by subtracting the total component runtime from the estimated component lifespan or determined through predictive failure analysis. In this illustration, a remaining lifespan threshold may be set at 7%, such that the data associated with a component having a remaining lifespan of less than the remaining lifespan threshold has been highlighted with a striped background. These components are the "identified components" that are nearing the end of their useful life and may be targeted for accelerate wear in accordance with embodiments of the present invention. Note that while Compute Node A has four memory modules, they each have a different remaining lifespan. In accordance with certain embodiments of the present invention, one of the identified workloads (Workload A, B or C) of FIG. 3 may be processed on the identified compute node (Compute Node A) of FIG. 4. The wear rate threshold and the remaining lifespan threshold may be independent increased or decreased. Furthermore, a separate wear rate threshold may be indicated for each component type, and a separate remaining lifespan threshold may be indicated for each component type.

Figure 5:
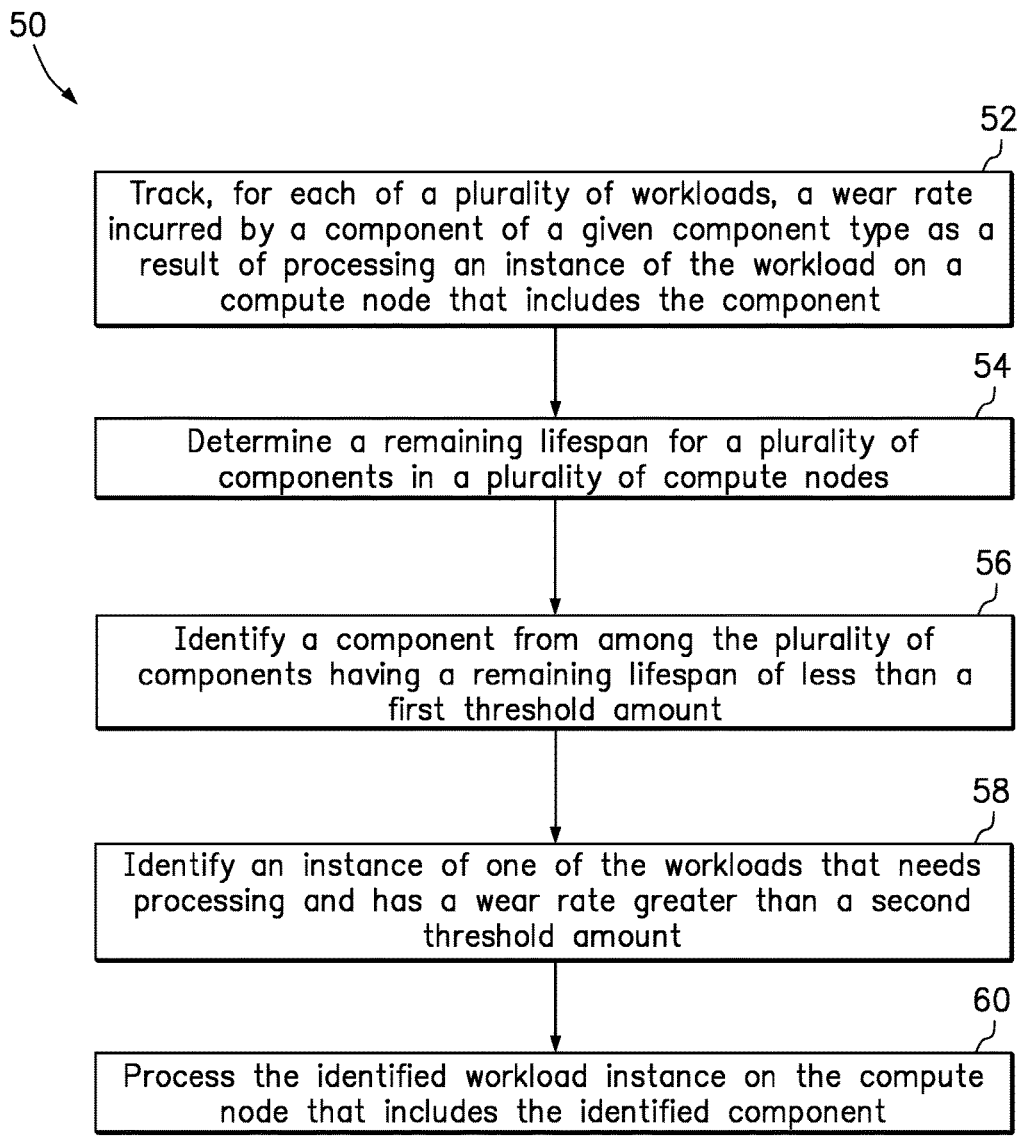
FIG. 5 is a flowchart of a method according to another embodiment of the present invention.

FIG. 5 is a flowchart of a method 50 according to another embodiment of the present invention. In step 52, the method tracks, for each of a plurality of workloads, a wear rate incurred by a component of a given component type as a result of processing an instance of the workload on a compute node that includes the component. In step 54, the method determines a remaining lifespan for a plurality of components in a plurality of compute nodes. In step 56, the method identifies a component from among the plurality) of components having a remaining lifespan of less than a first threshold amount. Step 58 includes identifying an instance of one of the workloads that needs processing and has a wear rate greater than a second threshold amount. Then, step 60 processes the identified workload instance on the compute node that includes the identified component.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer) program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.)

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.)

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.)

What is claimed is:

1. A method, comprising:
   tracking, for each of a plurality of workloads, a wear rate incurred by a component of a given component type as a result of processing an instance of the workload on a compute node that includes the component;
   determining a remaining lifespan for a plurality of components in a plurality of compute nodes;
   identifying a component from among the plurality of components having a remaining lifespan of less than a first threshold amount;
   determining an amount of time before the compute node that includes the identified component is scheduled to be taken out of service for maintenance;
   identifying an instance of one of the workloads that needs processing and has a wear rate greater than a second threshold amount, wherein the wear rate of the identified workload instance is for a component having the same component type as the identified component, and wherein the wear rate of the identified workload instance is great enough to exhaust the remaining lifespan of the identified component during the amount of time before the scheduled maintenance if the identified workload instance is processed on the compute node that includes the identified component; and
   processing the identified workload instance on the compute node that includes the identified component.

2. The method of claim 1, wherein tracking a wear rate incurred by a component of a given component type as a result of processing an instance of the workload, includes tracking a wear rate incurred by a plurality of components in a compute node as a result of processing an instance of the workload.

3. The method of claim 2, wherein the plurality of components in a compute node are selected from a processor, a memory module, and a data storage device.

4. The method of claim 1, wherein determining a remaining lifespan for a plurality of components of a computing system, includes subtracting, for each of the plurality of components, total run time from an average lifespan for the component.

5. The method of claim 1, wherein determining a remaining lifespan for a plurality of components of a computing system, includes predicting the remaining lifespan for each component based on a failure analysis using one or more measured performance parameters of the component.

6. The method of claim 1, wherein identifying an instance of one of the workloads that needs processing, including identifying an instance of one of the workloads that is queued for processing.

7. The method of claim 1, wherein identifying an instance of one of the workloads that needs processing, includes identifying an instance of one of the workloads that is currently being processed by one of the compute nodes in the computing system.

8. The method of claim 7, further comprising:
   migrating the identified instance of the workload to a compute node including the identified component.

9. The method of claim 1, wherein the schedule for maintenance is obtained from a management node.

10. The method of claim 1, further comprising:
    determining, for each workload that needs processing, an amount of time for an instance of the workload to exhaust the remaining lifespan of the identified component.

11. The method of claim 1, further comprising:
    periodically storing a snapshot of the state of the compute node processing the identified workload.

12. A computer program product comprising a non-transitory computer readable storage medium having program instructions embodied therewith, the program instructions executable by a processor to cause the processor to:
    track, for each of a plurality of workloads, a wear rate incurred by a component of a given component type as a result of processing an instance of the workload on a compute node that includes the component;
    determine a remaining lifespan for a plurality of components in a plurality of compute nodes;
    identify a component from among the plurality of components having a remaining lifespan of less than a first threshold amount;
    determine an amount of time before the compute node that includes the identified component is scheduled to be taken out of service for maintenance;
    identify an instance of one of the workloads that needs processing and has a wear rate greater than a second threshold amount, wherein the wear rate of the identified workload instance is for a component having the same component type as the identified component, and wherein the wear rate of the identified workload instance is great enough to exhaust the remaining lifespan of the identified component during the amount of time before the scheduled maintenance if the identified workload instance is processed on the compute node that includes the identified component; and process the identified workload instance on the compute node that includes the identified component.

13. The computer program product of claim 12, wherein the program instructions executable by the processor to cause the processor to track a wear rate incurred by a component of a given component type as a result of processing an instance of the workload, includes program instructions executable by the processor to cause the processor to track a wear rate incurred by a plurality of components in a compute node as a result of processing an instance of the workload.

14. The computer program product of claim 12, wherein the program instructions executable by the processor to cause the processor to determine a remaining lifespan for a plurality of components of a computing system, includes program instructions executable by the processor to cause the processor to subtract, for each of the plurality of components, total run time from an average lifespan for the component.

15. The computer program product of claim 12, wherein the program instructions executable by the processor to cause the processor to determine a remaining lifespan for a plurality of components of a computing system, includes program instructions executable by the processor to cause the processor to predict the remaining lifespan for each component based on a failure analysis using one or more measured performance parameters of the component.

16. The computer program product of claim 12, wherein the program instructions executable by the processor to cause the processor to identify an instance of one of the workloads that needs processing, including program instructions executable by the processor to cause the processor to identify an instance of one of the workloads that is queued for processing, and wherein the program instructions are further executable by the processor to cause the processor to:

assign the identified instance of the workload to a compute node including the identified component.

17. The computer program product of claim 12, wherein the program instructions executable by the processor to cause the processor to identify an instance of one of the workloads that needs processing, includes program instructions executable by the processor to cause the processor to identify an instance of one of the workloads that is currently being processed by one of the compute nodes in the computing system, and wherein the program instructions are further executable by the processor to cause the processor to:

migrate the identified instance of the workload to a compute node including the identified component.

18. The computer program product of claim 12, wherein the program instructions are further executable by the processor to cause the processor to:

periodically store a snapshot of the state of the compute node processing the identified workload.

* * * * *